(12) United States Patent
Harris et al.

(10) Patent No.: US 11,801,737 B2
(45) Date of Patent: Oct. 31, 2023

(54) TONNEAU COVER WITH INTEGRATED TABLE

(71) Applicant: Toyota Motor Engineering & Manufacturing North America, Inc., Plano, TX (US)

(72) Inventors: Ryan C. Harris, Saline, MI (US); Scott Louis Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/682,322

(22) Filed: Feb. 28, 2022

(65) Prior Publication Data
US 2023/0271488 A1    Aug. 31, 2023

(51) Int. Cl.
*B60J 7/14*    (2006.01)
*B60J 7/16*    (2006.01)

(52) U.S. Cl.
CPC ............. *B60J 7/141* (2013.01); *B60J 7/1607* (2013.01)

(58) Field of Classification Search
CPC ....... B60J 7/14; B60J 7/141; B60J 7/16; B60J 7/1607; B60P 7/02
USPC ............. 296/100.01, 100.02, 100.09, 100.18
See application file for complete search history.

(56) References Cited

U.S. PATENT DOCUMENTS

| | | | | |
|---|---|---|---|---|
| 2,471,730 A | * | 5/1949 | Doerr | B60N 3/001 108/44 |
| 4,824,163 A | * | 4/1989 | Hendrych | B60P 7/02 296/100.06 |
| 6,533,344 B1 | | 3/2003 | Patterson | |
| 7,628,439 B1 | * | 12/2009 | Strong | B62D 33/0273 296/57.1 |
| 9,914,384 B2 | | 3/2018 | Yilma et al. | |
| 10,017,099 B2 | | 7/2018 | Yilma et al. | |
| 10,086,684 B1 | * | 10/2018 | Stamm, Jr. | B60J 7/1621 |
| 10,309,120 B1 | * | 6/2019 | Noel, II | B60P 3/32 |
| 10,434,854 B2 | * | 10/2019 | Yilma | B25H 1/04 |
| 10,532,683 B1 | * | 1/2020 | Bowman | B60P 1/003 |
| 10,562,383 B2 | | 2/2020 | Williams et al. | |
| 11,427,264 B1 | * | 8/2022 | Ring | B62D 33/027 |
| 2006/0071498 A1 | * | 4/2006 | Taylor | B60P 3/14 224/404 |
| 2009/0236870 A1 | * | 9/2009 | Duncan | B60J 7/141 296/136.04 |
| 2018/0312099 A1 | | 11/2018 | Loew et al. | |

* cited by examiner

*Primary Examiner* — Jason S Daniels
(74) *Attorney, Agent, or Firm* — Christopher G. Darrow; Darrow Mustafa PC

(57) ABSTRACT

A tonneau cover for a vehicle can include a panel and a table. The panel can define a cavity. The table can be modifiable between a stowable configuration and a standing configuration. In the stowable configuration, the table is configured to stow inside the cavity. In the standing configuration, the table is configured to stand on a ground surface when removed from the cavity. In the stowable configuration, the table may be configured to further rigidify the panel such that a user of the vehicle can store cargo on top of the tonneau cover.

11 Claims, 2 Drawing Sheets

TONNEAU COVER WITH INTEGRATED TABLE

TECHNICAL FIELD

The embodiments disclosed herein relate to a tonneau cover and, more particularly, to a tonneau cover having an integrated table.

BACKGROUND

Some vehicles, such as pickup trucks, include open-topped beds used to carry various types of cargo. These vehicles can also include removable and/or stowable tonneau covers that can provide protection for cargo within the bed when attached thereto and access to the bed and/or cargo within the bed when folded back or removed therefrom.

SUMMARY

Disclosed herein are embodiments of a tonneau cover for a vehicle. In one aspect, a tonneau cover can include a panel and a table. The panel can define a cavity. The table can be modifiable between a stowable configuration and a standing configuration. In the stowable configuration, the table is configured to stow inside the cavity. In the standing configuration, the table is configured to stand on a ground surface when removed from the cavity. These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a tonneau cover for a vehicle. The tonneau cover can include one or more panels each defining a cavity. The cavity can be configured to stow one or more items, for example, a table. The table can be modifiable between a stowable configuration in which the table is configured to stow inside the cavity, and a standing configuration in which the table is configured to stand on a ground surface when removed from the cavity. When stowed inside the cavity, the table can be configured to further rigidify the panel so that a user of the vehicle can store cargo on top of the tonneau cover. When removed from the cavity, the user can use the table as a work station.

Figure 1:
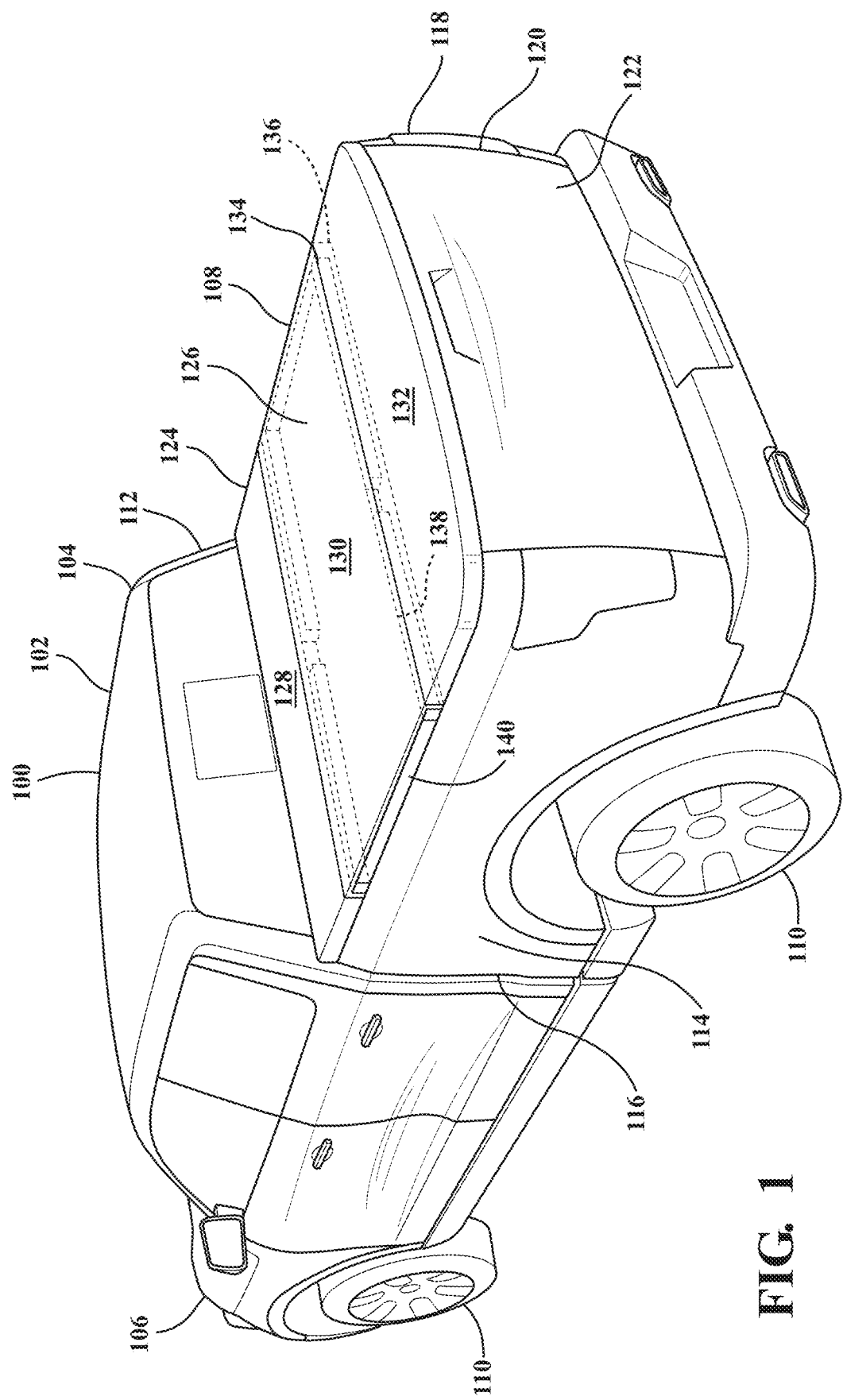
FIG. 1 is an example of a vehicle including a tonneau cover having an integrated table, showing a panel defining a cavity for stowing the table.

A representative passenger vehicle 100 is shown in FIG. 1. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100. As shown, the vehicle is a pickup truck.

The vehicle 100 includes an exterior 102 and a number of interior compartments. The compartments include a passenger compartment 104, an engine compartment 106, and an open-topped bed 108 for carrying cargo. Among other things, the vehicle 100 may include seats, a dash assembly, an instrument panel, controls, and the like housed in the passenger compartment 104. Additionally, the vehicle 100 may include an engine, a motor, a transmission, and the like, as well as other powertrain components, such as wheels 110, housed in the engine compartment 106 and elsewhere in the vehicle 100. The wheels 110 support the remainder of the vehicle 100 on the ground. One, some, or all of the wheels 110 are powered by the remainder of the powertrain components to drive the vehicle 100 along the ground.

The vehicle 100 includes a body 112 that forms the exterior 102 and defines or otherwise encloses the bed 108 and other compartments. In relation to the bed 108, the body 112 includes a deck, two sides 114, a bulkhead 116, and a rear end 118. Additionally, in relation to the passenger compartment 104 and the engine compartment 106, the vehicle 100 may include a floor forward of the deck, a partition forward of the bulkhead 116, a front end, a roof, a hood, and the like. At the rear end 118, the body 112 defines a tailgate opening 120. Similarly to other openings that open between the compartments and the exterior 102, the tailgate opening 120 opens between the bed 108 and the exterior 102. Relatedly, as part of the rear end 118, the body 112 includes a tailgate 122 corresponding to the tailgate opening 120. Similarly to other closure panels that correspond to other openings, the tailgate 122 is pivotally connected to the remainder of the body 112 for movement, relative to the tailgate opening 120, between a closed position over the tailgate opening 120 and an open position away from the tailgate opening 120.

The vehicle 100 also includes a tonneau cover 124. A user of the vehicle 100 can use the tonneau cover 124 to secure cargo in the bed 108 and/or protect cargo in the bed 108 from an external environment of the vehicle 100. The tonneau cover 124 is configured to rest on top of the bed 108 and cover at least a portion of the bed 108. The tonneau cover 124 can be configured to attach to the sides 114 and/or the tailgate 122 of the vehicle 100 using any suitable attachment device, for example, bolts, clamps, clips, etc.

The tonneau cover 124 can include one or more panels 126. As part of the tonneau cover 124, the panel(s) 126 are configured to rest on top of the bed 108 and cover at least a portion of the bed 108. The panel(s) 126 can be aligned transversely across the bed 108. In some instances, the tonneau cover 124 can be a rigid tonneau cover including panel(s) 126 formed of a plastic material or a composite material. In other instances, the tonneau cover 124 can be a semi-rigid tonneau cover including panel(s) 126 formed of a fabric material or a vinyl material.

As shown in FIG. 1, the tonneau cover 124 can be a folding tonneau cover with multiple folding panels 126 that are configured to fold on top of each other so that the user of the vehicle 100 can access the bed 108 and/or cargo within the bed 108 while the tonneau cover 124 is attached to the vehicle 100 and/or to make the tonneau cover 124 more portable. For example, as illustrated, the tonneau cover 124 is a tri-fold tonneau cover with a first panel 128, a second panel 130, and a third panel 132. In this example, the tonneau cover 124 can include hinges 134 in between the panels 126 to allow the panels 126 to fold on top of each other. For example, the third panel 132 can fold on top of the second panel 130, and the second panel 130 and the third panel 132 can fold on top of the first panel 128. In other examples, the tonneau cover can have any suitable number of folding panels 126, or the tonneau cover 124 can be a non-folding tonneau cover having one panel 126.

One, some, or all of the panel(s) 126 can include a cavity 136. As illustrated, the second panel 130 of the tonneau cover 124 includes a cavity 136, however, the first panel 128 and/or the third panel 132 can also include a cavity 136. In some instances, a user of the vehicle 100 may want to store items not only in the bed 108 under the tonneau cover 124, but also on top of the tonneau cover 124. Accordingly, the panel(s) 126 can be further rigidified to support cargo stored on top of them, for example, by integrating one or more items with the panels(s) 126 within one or more of the cavities 136. For example, one or more panel(s) 126 can include an integrated table 138 that is stowable inside one of the cavities 136. The cavity 136 can include an opening 140 to the side so that the table 138 can stow inside the cavity 136 from the side. The opening 140 can be on either side of the vehicle 100.

Figure 2:
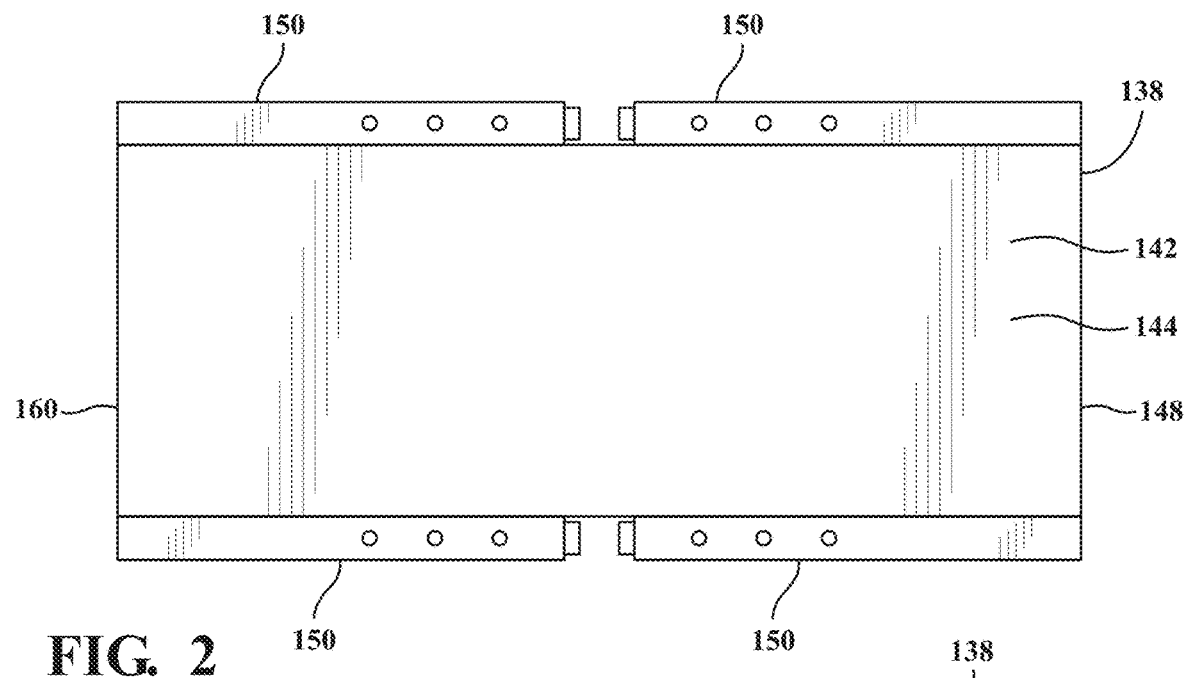
FIG. 2 is an example of a table in a stowable configuration in which the table is configured to stow inside the cavity.
Figure 3:
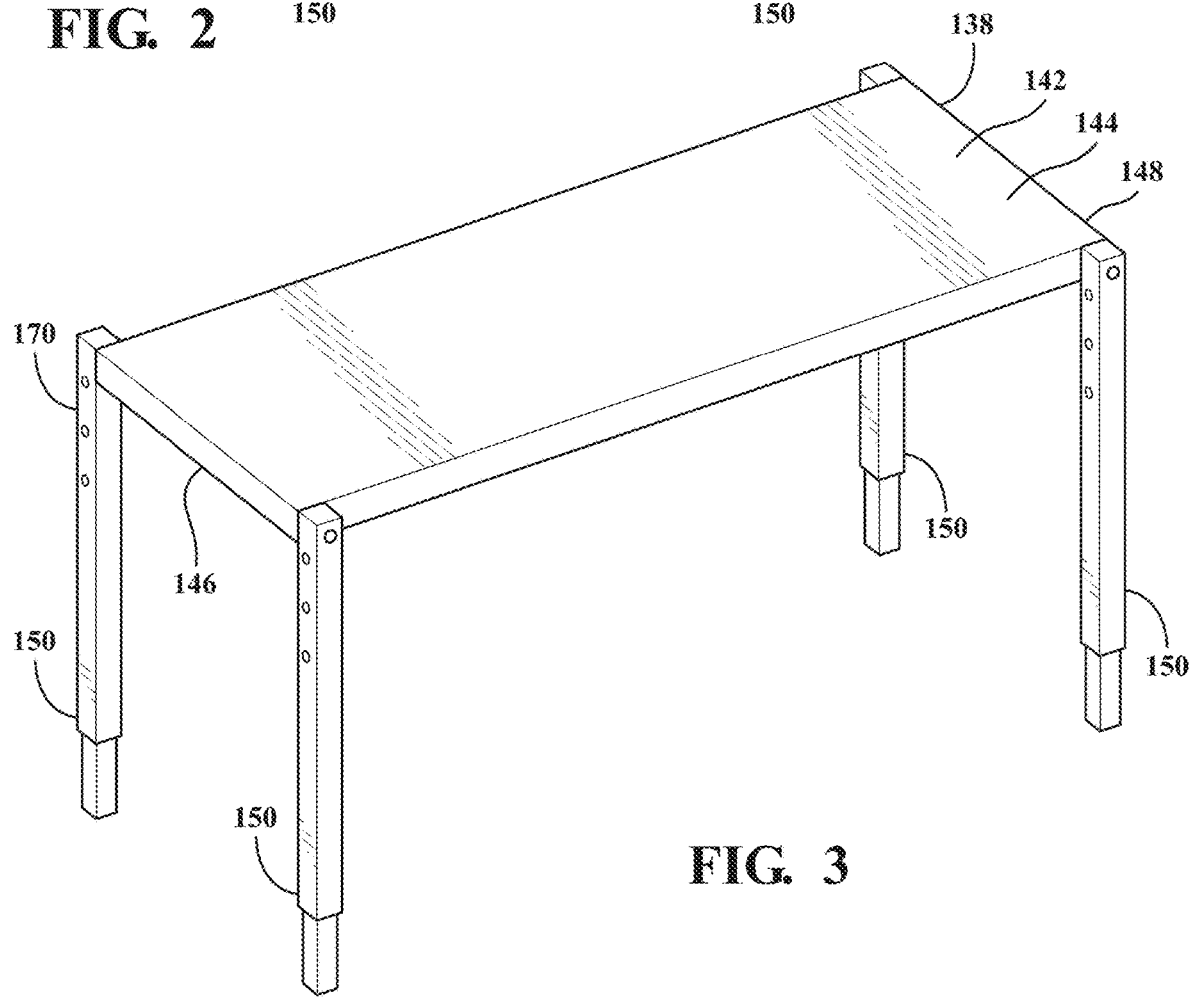
FIG. 3 is an example of the table in a standing configuration in which the table is configured to stand on a ground surface when removed from the cavity.

With additional reference to FIGS. 2 and 3, the table 138 can be sized, shaped, and otherwise configured to slidably stow inside a cavity 136 of one of the panel(s) 126 and rest on top of the bed 108 together with the panel 126. For example, the length of the table 138 can be substantially the same as the width of the bed 108 such that the ends of the table 138 rest on the sides 114 of the bed. The table 138 can include one or more components configured to stow inside the cavity 136. As a part of these components, the table 138 can include a table top 142. The table top 142 can have substantially the same size and shape as the cavity 136 such that it stows easily inside the cavity 136 by sliding into the cavity 136. The table top 142 can be formed from a rigid material such as plastic, metal, or composite material. The table top 142 can include a top side 144, a bottom side 146, and an outer perimeter 148.

The table 138 can also include table legs 150. As shown, the table 138 includes four table legs 150. The table legs 150 can be hingedly connected to the table top 142. For example, as shown, the table legs 150 can be hingedly connected to the outer perimeter 148 of the table top 142. Alternatively, the table legs 150 can be hingedly connected to the bottom side 146 of the table top 142. Each table leg 150 can be about half as long as the table top 142 so that each table leg 150 can fold substantially parallel to the table top 142 to allow the table 138 to slide into the cavity 136.

The table 138 is modifiable between a stowable configuration 160 for stowage inside the cavity 136, as illustrated in FIGS. 1 and 2, and a standing configuration 170 when removed from the cavity 136, as illustrated in FIG. 3. In the stowable configuration 160, the table legs 150 can be folded substantially parallel to the table top 142 so that the table 138 slides into the cavity 136. When stowed inside the cavity 136 and resting on top of the bed 108 together with the panel 126, the table 138 may further rigidify the panel 126 such that a user of the vehicle 100 can store cargo on top of the tonneau cover 124.

In the standing configuration 170, the table legs 150 can be folded away from the table top 142 substantially perpendicular to the table top 142 so that the table 138 can stand on a ground surface. When removed from the cavity 136, a user of the vehicle 100 may use the table 138 as a work station or for any other suitable purpose. In some cases, when a user of the vehicle 100 is using the table 138 in the standing configuration 170, the user may want to adjust the height of the table 138. Accordingly, the table legs 150 can have adjustable lengths. As shown, the table legs 150 can be extendable and retractable, for example, each table leg 150 can be a telescoping table leg. A user can modify the height of the table 138 using the telescoping table legs 150.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tonneau cover, comprising:
   a panel, the panel defining a cavity formed inside the panel; and
   a table, the table modifiable between a stowable configuration, in which the table is configured to stow inside the cavity, and a standing configuration, in which the table is configured to stand on a ground surface when removed from the cavity.

2. The tonneau cover of claim 1, wherein the tonneau cover includes a plurality of panels, each panel defining a cavity.

3. The tonneau cover of claim 2, wherein the tonneau cover includes three folding panels respectively defining three cavities.

4. The tonneau cover of claim 1, wherein the panel is formed of at least one of a plastic material and a composite material.

5. The tonneau cover of claim 1, wherein the panel is formed of at least one of a fabric material and a vinyl material.

6. The tonneau cover of claim 1, wherein the table, when stowed inside the cavity, is configured to further rigidify the panel for supporting cargo stored on top of the panel.

7. The tonneau cover of claim 1, wherein the table includes:
   a table top having substantially the same size and shape as the cavity; and
   a plurality of table legs hingedly connected to the table top.

8. The tonneau cover of claim 7, wherein the table legs are folded substantially parallel to the table top when the table is in the stowable configuration.

9. The tonneau cover of claim 7, wherein the table legs are folded substantially perpendicular to the table top when the table is in the standing configuration.

10. The tonneau cover of claim 7, wherein the table legs have adjustable lengths for modifying a height of the table.

11. The tonneau cover of claim 7, wherein the table legs are telescoping table legs.

* * * * *